Aug. 16, 1932.  J. C. MASEK  1,872,154
THEATER LIGHTING CONTROL MECHANISM
Filed Aug. 24, 1926  6 Sheets-Sheet 5

INVENTOR
James C. Masek
BY
ATTORNEY

WITNESSES:

Patented Aug. 16, 1932

1,872,154

UNITED STATES PATENT OFFICE

JAMES C. KASEK, OF IRWIN, PENNSYLVANIA, ASSIGNOR TO WESTINGHOUSE ELECTRIC & MANUFACTURING COMPANY, A CORPORATION OF PENNSYLVANIA

THEATER LIGHTING CONTROL MECHANISM

Application filed August 24, 1926. Serial No. 131,303.

My invention relates to lighting control mechanism and particularly to mechanism for controlling the lighting circuits of theaters.

In the present theater lighting practice, there are provided a large number of separate circuits for the auditorium and stage and circuits for lighting any particular part of the auditorium and stage are duplicated in order to provide circuits having different colored lamps therein, for instance, white, red, blue and amber.

Heretofore it has been customary to provide a switchboard mechanism having dimmer banks thereon or adjacent thereto and control switches for the lighting, the latter being capable of presetting or pre-arranging for a plurality of scenes in order that preselected circuits may be kept energized during each scene, and the lighting changed for a succeeding scene by simply opening one master scene switch and closing another selected master scene switch. The dimmers commonly used with such apparatus comprise resistance grids or discs mounted upon the rear of the switchboard or adjacent thereto. Dimmer grids are usually arranged in parallel rows and are driven through common driving shafts through the medium of clutch mechanism which may be adjusted to cause preselected dimmers to be moved in either direction to increase or decrease the current intensity of the circuit during a predetermined movement of the driving shafts. Such dimming apparatus is capable of being preset for one scene only and the setting of the dimmers must be changed between each scene, which operation requires the presence of a skilled operator.

Switchboard apparatus of the type and character above described necessitates a relatively large switchboard which occupies valuable space upon the stage floor and, because of the cumbersome construction of the switchboard in general, the manufacturing costs are also relatively high.

It is an object of my invention to provide a theater lighting switchboard in which the lighting of the various circuits may be preset for any desired number of scenes without necessitating disturbance of the lighting control mechanism and wherein the current intensity supplied to the circuits is regulated by instrumentalities that may be preset for any desired number of scenes and wherein the current intensity supplied to the circuits during any scene may be caused to be increased or decreased at any preselected time during the scene or at any preselected rate of change during the scene.

A further object of my invention is to provide a theater lighting switchboard having the above-noted characteristics wherein instrumentalities are provided which may be preset for any desired number of scenes to cause any desired circuit to be energized at any predetermined time during a scene.

Another object of my invention is to provide a theater lighting switchboard having the above-noted characteristics wherein all presetting operations may be conducted from the front of the board and wherein the preselected position of the circuit-controlling instrumentalities are indicated in plain view upon the front of the board in order that the operator may readily operate the controls to determine the desired effect. In order to facilitate presetting or preselection of the circuits, provision is made for disconnecting the circuit-controlling units from the common driving mechanism for all circuit control apparatus and the controls then manipulated individually.

Another object of my invention is to provide a theater lighting control mechanism wherein each control unit for a circuit is individually mounted upon a drawer which may be removed from a recess in the switchboard without disturbing neighboring units, for the purpose of inspection and repair and for the purpose of providing means whereby service may be restored in a circuit containing disordered apparatus by simply inserting a reserve or "stand-by" unit.

A further object of my invention is to provide a theater lighting control mechanism wherein reactance current regulators or reactors may be employed in place of the usual resistance grid or disc, in order to simplify mechanical structure necessary for the control and to conserve space, for the reason that the reactors may be placed at a remote point from the control apparatus on the switchboard, preferably in the basement, and off of the stage. By reason of the elimination of the usual cumbersome resistance grid, the overall dimensions of the switchboard may be materially reduced and, in the present instance, a given number of lighting circuits may be accommodated by a switchboard, practically one-fourth the area of switchboards of the usual type.

These and other objects that will be made apparent throughout the further description of my invention are attained by means of the switchboard apparatus hereinafter described and illustrated in the accompanying drawings, wherein.

Figure 1:
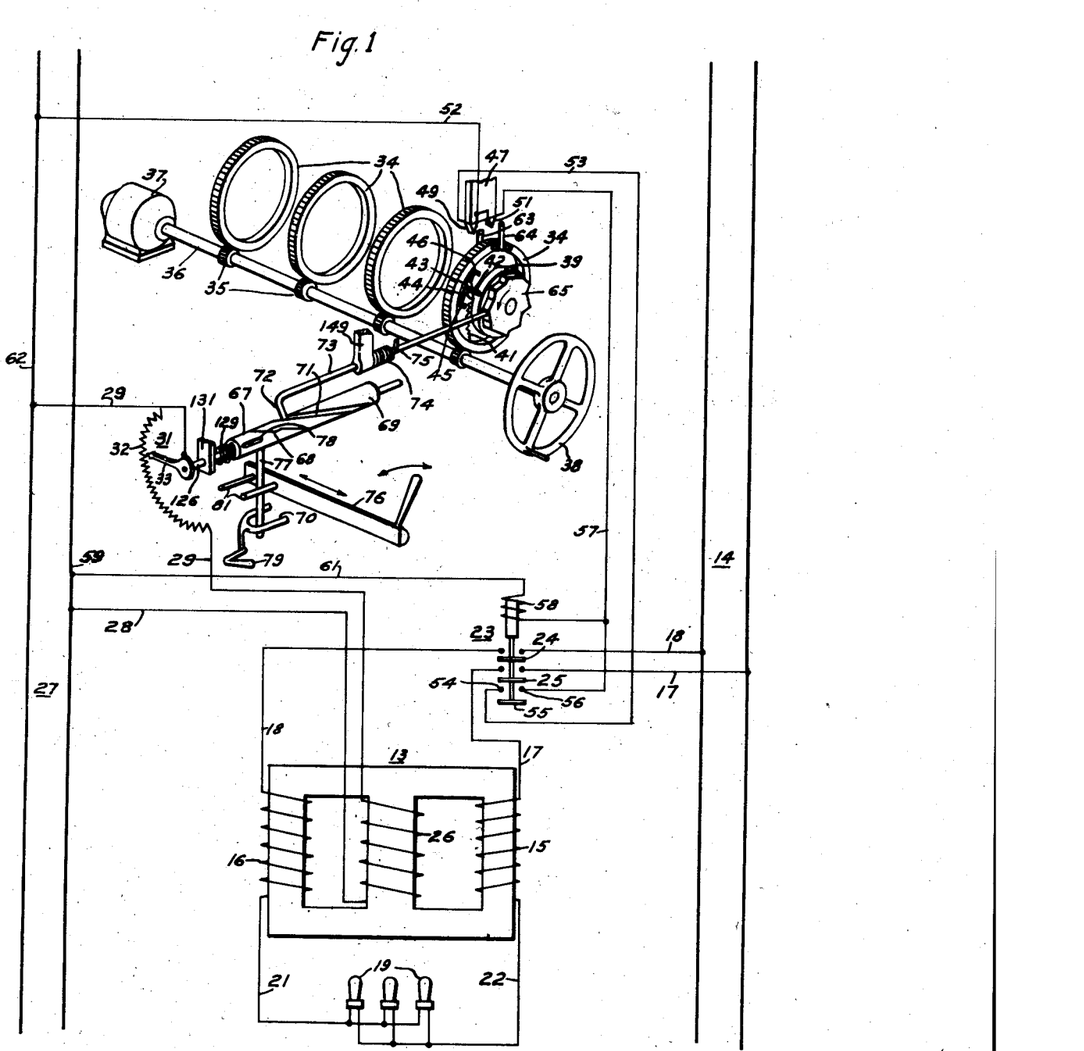
Figure 1 is a diagrammatic view of apparatus and wiring circuits illustrating apparatus and wiring connections for one representative circuit.

Referring to the diagrammatic view of the apparatus and wiring diagram of a single representative circuit, illustrated in Fig. 1, the apparatus comprises essentially a reactor 13, an alternating-current feed circuit 14, that is connected to coils 15 and 16 of the reactor by means of conductors 17 and 18 which are included in a lighting circuit. The lamps 19 constituting the lighting elements of the lighting circuit are connected in parallel across the conductors 21 and 22 which are connected to the coils 16 and 15, respectively. The circuit through the reactor and the lighting units is controlled by a current-responsive reactor switch 23 having contacts 24 and 25 that control the current through the conductors 17 and 18.

The current intensity supplied to the lighting unit is controlled or regulated by the intensity of flux variations which are controlled by a coil 26 connected to a direct-current control circuit 27 by means of conductors 28 and 29. A variable resistance unit 31 is connected to the conductor 29 and is in series with the coil 26.

The resistance unit 31 comprises a resistance coil 32 and a movable contact member 33. Variations in the resistance of the circuit through the coil 26 causes variations in the flux of the center core of the reactor which correspondingly effect the intensity or voltage of the current supplied to the lighting units 19. The resistance 31 may be varied to cause any desired lighting effect.

When the contactor switch 23 is closed, the lighting circuit is energized and the resistance unit 31 determines the degree of energization of the circuit. The means for controlling the contactor switch 23 and the resistance unit 31 comprises a driven rotatable drum member 34, one of which is provided for each lighting circuit, four of such drum members being illustrated in Fig. 1. The drum members 34 are driven by means of pinions 35 mounted on a driving shaft 36 connected to a motor 37 and provided with a hand-operating wheel 38.

A follower drum 39 is mounted concentric to the driven drum 34 and is yieldingly connected thereto by means of a spring 41. The follower drum has limited movement with respect to the driven drum 34 and is adapted to be held stationary, while the drum 34 is rotated, by means of a clamp screw 42 having radial wings 43 and 44 that are alternately engaged by adjustable pins 45 and 46 mounted upon the drum 34. The pin 45 tends to move the clamp screw 42 into engagement with the follower drum 39 and causes the latter to be arrested in its movement while the driven drum 34 continues to rotate. The pin 46 serves to release the clamp screw and permit the spring 41 to cause following movement of the follower drum until it has returned to a predetermined position with respect to the driven drum 34.

The purpose of permitting relative movement of the drums 34 and 39 is to obtain energization of the circuits at predetermined times and at predetermined intensities and the apparatus for securing relative movement and the variations of energization of the circuit will be hereinafter more fully described.

The energization of the circuit at predetermined times is accomplished by the following described apparatus.

A stationary bracket 47, that is mounted upon the drawer frame 82, supports a normally closed switch 49 and a normaly open switch 51, to be hereinafter more fully described, a contact member of each switch being connected to a common control conductor 52 which constitutes part of a circuit for controlling the contactor switch 23. One of the contact members of the switch 49 is connected to a conductor 53 that is connected to a terminal 54 of a bridging switch 55 and one of the terminals of the normally opened switch 51 is connected to a terminal 56 of the bridging switch 55 by the conductor 57. The electro-magnet coil 58 of the contactor switch 23 is connected to the conductor 59 of the control circuit 27 by a conductor 61, the conductor 52 being connected to the other control conductor 62.

Figure 3:
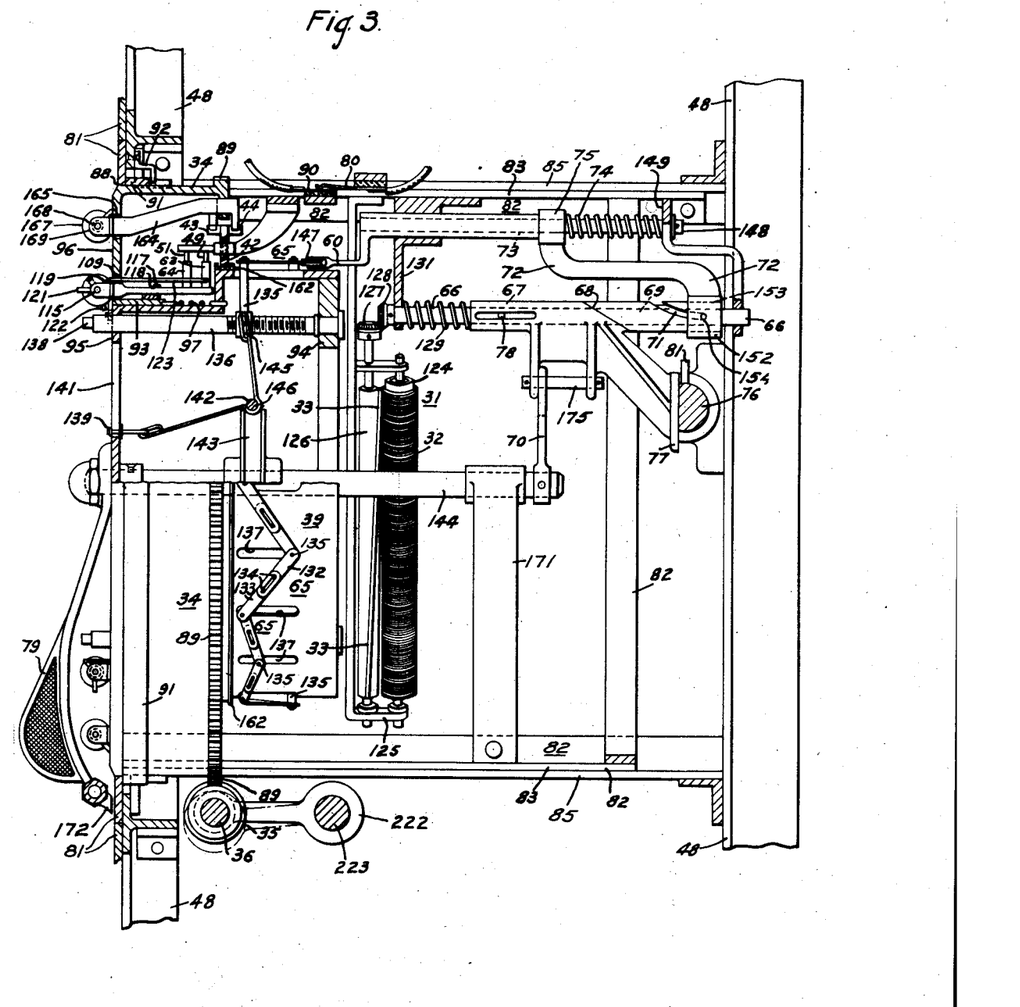
Fig. 3 is a view, partially in elevation and partially in section, the section being taken on the broken line III—III of Fig. 2.
Figure 13:
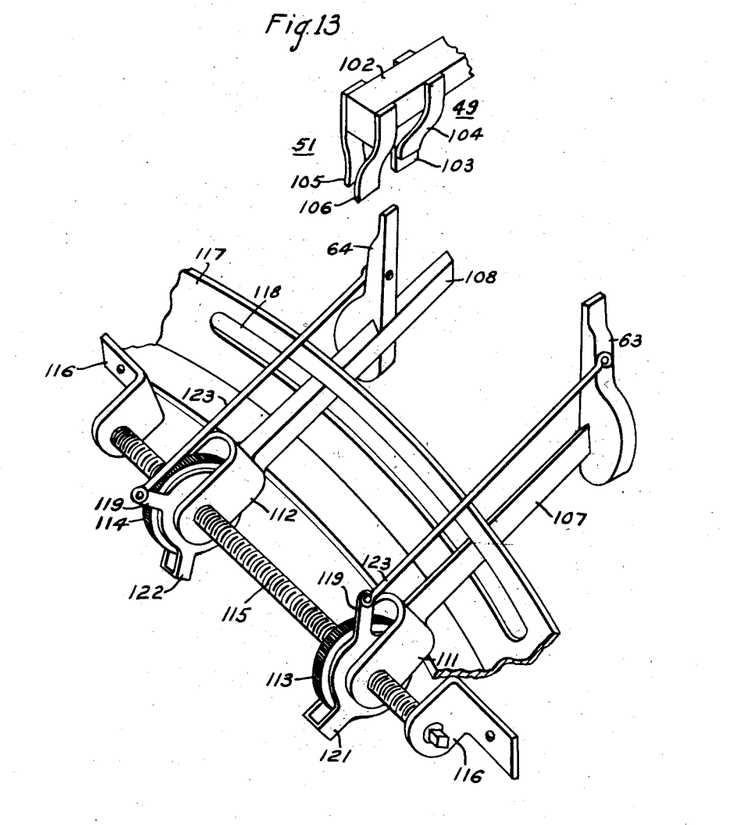
Fig. 13 is a fragmental perspective view of mechanism for controlling the energization of the circuits.

The driven drum 34 is provided with two adjustable members 64 and 63 which will be more fully explained hereafter and which serve when in the position shown in Figs. 1, 3 and 13 to respectively engage the switches 51 and 49 and cause the former to close and the latter to open at predetermined intervals when the driven drum 34 is moved a predetermined distance.

The follower drum is provided with an adjustable cam 65 diagrammatically represented in Fig. 1 and which will be more fully described hereafter. The cam 65 is provided with a plurality of substantially straight cam surfaces that are articulated in order that the surfaces may be angularly adjusted, one with respect to the other, there being two such surfaces provided for each scene and, in the case of the present apparatus which is adapted for ten scenes, the cam is provided with twenty adjustable cam surfaces for a purpose to be hereinafter described.

The cam 65 is for the purpose of altering the position of the contact member 33 with respect to the resistance 32 which controls the reactor 13. The resistance member 33 is mounted upon a shaft 126 that is connected to a rotatable clutch member 67 having an inclined cam surface 68 that coincides with a similar cam surface on a rotatable drum on shaft 69 which is provided with a helical groove 71 for receiving a driving finger 72 that is connected to a non-rotatable longitudinal movable shaft 73 which is yieldingly retained in operative contact with the cam surfaces of the cam 65 by means of a spring 74 interposed between a stationary bracket 149 on the frame 83 and a stop member 75 on the shaft.

It will be seen from the foregoing that, as the cam 65 is rotated counter-clockwise in the direction of the arrow, the shaft 73 is moved longitudinally, which movement imparts through the driving finger 72, rotary movement to the shaft 69 by reason of its engagement with the helical groove 71. The rotary movement of the shaft 69 is imparted to the shaft 67 by reason of the engagement of the cam surfaces 68 of the shaft members 67 and 69. The movable member 33 of the resistance unit 31 is therefore moved in response to rotation of the cam 65 and the degree of movement is proportional to the angle of the cam surface as will be hereinafter explained.

In order to provide for individual and independent movement of the movable resistance member 33, with respect to the cam 65 so that the dimmer of one circuit may be actuated independently to the dimmers of other circuits, means are provided for moving all of the shafts 67 longitudinally forward in order to permit rotary movement thereof with respect to the shafts 69. Longitudinal movement is accomplished by rotating the semi-circular shaft 76 in a counter-clockwise direction, causing the upper edge of the shaft to engage the rear side of an extension 77 on the shaft 67 which is splined to the shaft 66 by means of a slot and pin engagement 78. An indicator handle 79, having a lost-motion connection with the extension 77 through the medium of a fork 70 which engages the extension 77, may be oscillated for causing rotation of the movable resistance member 33 when it is desired to move the resistance 33 independently of the cam 65 or of other resistance units 31 of neighboring control units.

When it is desired to simultaneously move a plurality of resistance units to cause full lighting or total darkness at any time during a scene, this may be accomplished by moving the rocking shaft 76 longitudinally, thereby causing pins 81 to alternately engage opposite sides of the extension 77 of the shaft 67 and to cause oscillation thereof. Structural details and operation of the apparatus above described will be more fully described hereinafter.

Assuming that there is a pair of adjustable pins 45 and 46 and a pair of adjustable members 63 and 64 on each driven drum 34, for each scene and that there are two adjustable cam surfaces on the cam 65 for each scene, the operation is as follows. The positions of the members 45 and 46, 63 and 64 and the cam members having been preset to produce desired lighting effects, when the scene is started, the shaft 36 is rotated either by an electric motor 37 or by the hand wheel 38 at a speed that will cause the driven drum to be rotated through eighteen degrees (provided the drum is equipped to accommodate ten scenes), during the period of a scene.

Considering, at this time, the operation of the control mechanism for a single circuit, and that it is desired that the lights of that circuit be "on", during the entire period of the scene and that it is desired that during that scene the light intensity be gradually diminished from the beginning to the end of the scene, the adjustable members 45 and 46 are so positioned in a manner to be hereinafter described, that they will not engage the clamp screw 42 during the scene, thereby permitting the follower drum 39 and cam 65 to rotate with the driven drum 34. The cam surface in operative engagement with the shaft 73 will be adjusted to effect movement of the movable resistance arm 33 to increase the resistance as the cam is rotated. The adjustable members 63 and 64 carried by the driven drum 39 are so adjusted that the member 64 causes closure of the switch 51 upon initial movement of the driven drum 34 and the member 63 will be so positioned that it will not cause opening movement of the normally closed switch 49 until the driven drum and follower drum have been rotated through at least 18°.

The instant the normally open switch 51 is closed, it will be seen from the diagram, Fig. 1, that current flows from the control conductor 62 through conductor 52, switch 51, conductor 57, coil 58, conductor 61, to the control circuit conductor 59. Energization of the coil 58 causes the contactor switch 23 to be moved to closed position, wherein the lighting circuit is energized through conductors 17 and 18 connected to the conductors of the load feed circuit 14. Initial movement, therefore, of the driven drum and follower drum causes the lamps connected to the circuit controlled thereby to be energized and as the cam 65 is rotated in a counter-clockwise direction, the forward movement of the shaft 73 causes clockwise rotation of the movable resistance arm 33, thereby increasing the resistance in the control circuit through the coil 26. The change of flux in the reactor 13 causes a corresponding reduction of current intensity or voltage in the lamp circuit, with the result that, as the scene progresses, the amount of illumination is gradually diminished.

The manner of adjusting the members 45, 46, 63, and 64 and the cam 65 will be hereinafter more fully explained.

It will be understood that the control unit is capable of such adjustment as to cause the lamps of any circuit to be energized at any predetermined time during the scene and for any predetermined period during the scene and that the current intensity supplied to the lamp circuit may be increased or decreased or retained constant during any predetermined period of the scene, and that provision is made whereby such adjustments may be preset or preselected for any number of scenes within the capacity of the control mechanism which, in the present instance, is ten scenes.

Figure 2:
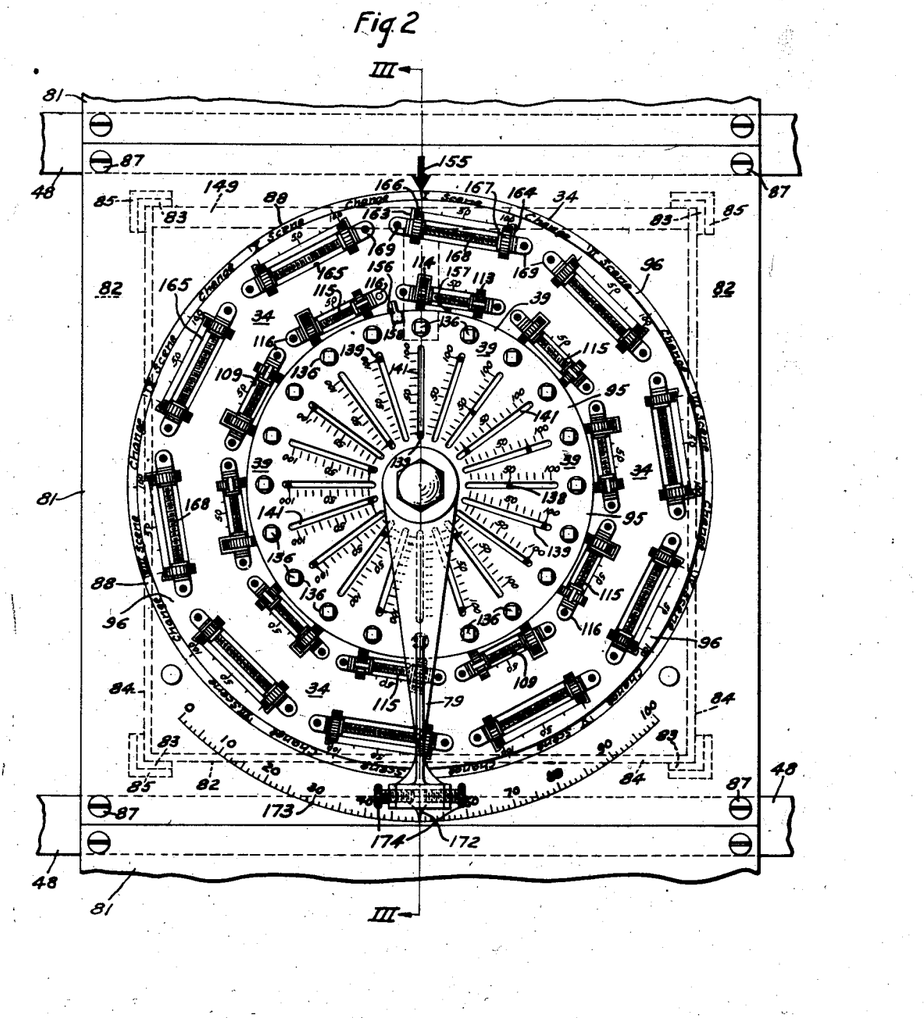
Fig. 2 is a front elevational view of a lighting control unit shown mounted upon a structural switchboard frame and embodying features of my invention.

Referring more particularly to Figs. 2 and 3, which illustrate the construction of a complete control unit for one circuit capable of controlling the illumination for ten scenes, the unit comprises a drawer structure consisting of a substantially square front plate 81 to which a frame structure 82 is secured having four corner members 83 made of commercial angle iron tied together by metal straps 84 to form a rigid box-like frame which we will hereinafter designate as a drawer. The corner members 83 fit within four angular corner members 85 that are secured in any preferred manner to the switch board frame structure 48. The drawer, therefore, may be withdrawn from the switchboard frame after the retaining screws 87 have been removed.

The front plate 81 is provided with a circular opening 88 in which the driven drum 34 is rotatably mounted, the drum comprising a cylinder extending rearwardly and is provided adjacent its rear extremity with an annular worm wheel 89. An annular collar 91 is secured to the exterior of the drum 34 adjacent the front end and engages the rear face of the front plate 81 and serves to prevent longitudinal displacement of the driven drum in a forward direction. Brackets 92 (one of which is shown), detachably secured to the switchboard frame 48 and equidistantly disposed about the circumference of the drum 34, serve to prevent longitudinal displacement of the drum in a rearward direction. The drum is provided with an inwardly directed annular flange 93, which constitutes a bearing cylinder for supporting the follower drum 39 which comprises a cylinder extending rearwardly, as indicated in Fig. 3, the rear half thereof being of enlarged diameter and provided adjacent its rear extremity with an annular end plate 94, the purpose of which will hereinafter appear. The drum 39 is provided with a front end plate 95 that fits within the cylinder 93 of the driven drum 34. The drum 39 is yieldingly connected to the drum 34 by means of a helical spring 97 having its ends secured, respectively, to the drum 39 and to the cylinder 93, as indicated in Fig. 3, and which serves to yieldingly retain the drums in a predetermined relative position, but which permits of relative movement of the drums when the movement of the follower drum 39 is momentarily arrested for a purpose to be hereinafter described.

As indicated in Fig. 1, the driven drums 34 are geared to a driving shaft 36 through the medium of the worm gear 89 and the worm or pinion 35, it being understood that the units are arranged in horizontal rows and connected in the manner indicated in Fig. 1. Where a large number of circuits are accommodated, the rows of units may be superimposed and the shafts 36 for driving the units of each horizontal row may be connected for simultaneous rotation by a vertical shaft that is geared to the horizontal shafts. Such driving arrangements being well-known in the mechanical art, no illustration is herein given for the means for driving the plurality of parallel shafts.

Since the control mechanism for the relays and reactors is substantially all mounted upon the drawer frame 82, to obtain access to the control apparatus for inspection and repair, the drawer is withdrawn. An auxiliary "standby" drawer unit similar to the one withdrawn may be inserted and service immediately restored. All circuit connections such as those between the switches 49 and 51 and the relay and between the rheostat and the reactor are provided with separate contact terminals 80 and 90 which engage and connect the conductors of the circuits when the drawer is in operative position, the terminal 90 being mounted on the drawer frame 83 and the terminal 80 being mounted on the switchboard frame 85 and insulated thererfom.

*Preset light control mechanism*

Referring particularly to Figs. 2, 3, 9, 10 and 11, the means for obtaining pre-selection of the control mechanism for energizing any selected circuit at any time and for any predetermined period during a scene will be first considered.

Since, during a scene, the driven drum is rotated continuously and it is desired to cause a light circuit to be energized at any predetermined time or during any predetermined period of the scene, the operating means for the control switches 49 and 51, which control the energization of the reactor switch coil 58, are mounted upon the driven drum 34. Referring to Figs. 9, 10, 11 and 13, it will be noted that the normally closed switch 49 and the normally open switch 51 are mounted upon an insulating bar 102 which is detachably secured to the bracket 47.

Figure 11:
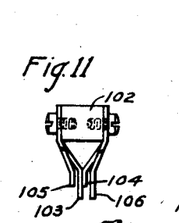
Fig. 11 is an end elevational view of the switch mechanism shown in Fig. 10.

The normally closed switch 49 comprises a pair of flexible metal contact straps 103 and 104 which are normally biased into engagement, as indicated in Figs. 11 and 13, and the normally open switch consists of a pair of flexible metal straps 105 and 106 that are normally biased to disengaged or opened position. The strap 103 of the normally closed switch 49 is longer than the strap 104 and is adapted to be engaged by the adjustable pin 63 that is adjustably mounted on the driven drum 34 and the circuit therethrough interrupted. The contact strap 106 of the normally opened switch 51 is adapted to be engaged by the adjustable member 64 also carried upon the driven drum 34 and the circuit through the switch is closed when the strap member 106 is moved into engagement with the strap member 105.

Referring to Figs. 2, 3 and 13, the adjustable members 63 and 64 are non-rotatively and slidably mounted upon adjustable bars 107 and 108, respectively, which extend through a slot 109 in the front plate 96 of the drum 34, the outer ends being bifurcated to constitute yokes 111 and 112, respectively, for receiving threaded adjusting wheels 113 and 114, respectively. The adjusting wheels 113 and 114 are threaded upon a threaded shaft 115 that is fixed to the front plate 96 of the driven drum 34 by means of brackets 116. An annular guide ring 117 is mounted on the flange 93 of the driven drum 34 and is provided with slots 118 through which the bars 107 and 108 extend. The ring 117 serves to support and guide the free ends of the bars 107 and 108.

The members 63 and 64 for normally operating the switches 49 and 51, respectively, are slidably mounted on the bars 107 and 108 in order that the members 63 may operate the switch 51 and the member 64 operate the switch 49 when circumstances so demand, as will hereinafter be explained. The longitudinal movement of the members 63 and 64 on the bars is effected by means of cranks 119 pivotally mounted upon the screw shaft 115 and provided with operating handles 121 and 122 for respectively operating members 63 and 64. Connecting rods 123 pivotally connect the cranks with the members 63 and 64, as indicated in Figs. 3 and 13. The operating members 63 and 64 may therefore be alternately moved to forward or rear positions, as desired. When the operating handle 121 is in the horizontal position shown in Fig. 3, the member 63, to which it is connected, occupies the rearward position in which it may be moved into operative engagement with the normally closed switch 49. It will be noted that the operating handle 122 is in its lowermost position, thereby causing the member 64 to occupy its forward position in which it is in operative relation to the normally open switch 51.

When the members 63 and 64 are in the positions indicated in Figs. 3 and 13, counter-clockwise rotation of the drum 34 will cause the member 64 to engage the contact strap 106 and momentarily close the normally open switch 51, thereby energizing the coil 58, Fig. 1, which will close the contactor switch 23 and hold it closed, the circuit through the coil 58 being then maintained through the normally closed switch 49 and the bridging switch 55 that is held in engagement with contact terminals 54 and 56, see Fig. 1.

The light circuit will remain energized until the drum 34 has moved the member 63 into engagement with the contact strap 103 of the normally closed switch 49 and has caused the switch to open momentarily, thereby causing interruption of the circuit through the coil 58 and consequent opening of the light circuit.

From the foregoing it is apparent that, with the members 63 and 64 in the positions shown in Fig. 13, the light circuit will be energized after the drum 34 has moved a predetermined distance and because the drum started rotation at the beginning of a scene, the light circuit is energized at a preselected time during the scene, determined by the preset adjusted position of the member 64, or when the latter has closed the normally open switch 51.

The light circuit will remain energized until the member 63 opens the normally closed switch 49, and therefore the time that the circuit is opened can be preselected by adjusting the member 63 along the screw shaft 115.

The members 64 and 63 may be so positioned along the shaft 115 as to cause the light circuit including the lamps to be energized at the begining of a scene, and illumination retained during the entire scene, or the lamps may be illuminated and extinguished at any time during the scene. In the event that it is desired to start the scene with illumination of a certain circuit and extinguish the light during the scene and again illuminate them, the relative postions of the members 63 and 64 with respect to the switches 49 and 51 must be transposed to cause the member 64 to engage switch 49 to open the circuit at a predetermined time, and the member 63 to engage the switch 51 and close it at a predetermined time.

Transposition of the members 63 and 64 is accomplished by reversing the positions of the handles 121 and 122, respectively, which action causes the desired movement of the members along the rods 107 and 108, the member 63 being moved forward thereon and the member 64 being moved rearward.

*Dimmer control apparatus*

Referring particularly to Figs. 1, 2, 3 and 12, the apparatus for controlling the current intensity of each lighting or lamp circuit comprises the means previously described for actuating the movable resistance member 33. The resistance element 31 comprises a resistance coil 32 that is wound upon a drum 124 made of refractory insulating material and mounted upon a bracket 125 secured to the drawer frame 82.

The movable member 33 comprises a metal shaft 126, upon which the movable contact member 33 is mounted in the form of a helix, as indicated in Fig. 3. The drum 126 is rotatably mounted upon the bracket 125 and as the drum is rotated, the contact strip or member 33 successively engages different points along the resistance coil 32 and inserts resistance in accordance with the point of contact of the member 33 with the coil 32. Rheostats of this form are well-known in the art and no claim is made to the specific form of rheostat or resistance element herein illustrated, except that in the present instance, it is desirable to so mount the member 33 upon the drum 126 that the pitch thereof is variable, thus compensating for differences in ratio of resistance of the rheostat to voltage of the reactor, in order that the position of the indicator 139 may correctly indicate on a uniformly graduated scale, the degree of illumination.

The shaft 126 is provided with a pinion 127 that meshes with a pinion 128 secured to the shaft 66, upon which the clutch member 67 is splined by means of a slot and pin engagement 78. The clutch member is provided with an inclined cam surface 68 that engages a correspondingly inclined cam surface on a cam member 69 which is provided with a helical groove 71 and which is rotatably mounted on the shaft 66. A spring 129 disposed between a bracket 131 on the drawer frame 82 and the end of the cam 67 serves to yieldingly press the cam 67 into engagement with the cam sleeve 69.

As previously stated, the intensity of the current supplied to the lighting circuit is determined by the positions of a cam structure 65 having an adjustable cam surface.

Referring to Fig. 3, the adjustable cam 65 comprises a plurality of telescoping slotted links 132 and 133 that are slidably connected by rivets 134. The composite link formed by the links 132 and 133 constitutes a cam surface that is adjustable in length and which may be contracted or elongated for the purpose to be hereinafter described. Each composite link is pivoted to an adjoining link and mounted upon an adjustable pedestal 135 that is threaded upon an adjusting screw 136 rotatably mounted upon the follower drum 39. The pedestals 135 project exteriorly through longitudinal slots 137 in the drum 39. The outer end of the adjusting shaft 136 is provided with a square extension 138 for receiving a detachable key (not shown) which may be used to adjust any of the adjusting screws 136.

In a ten scene control drum, two composite cam links are provided for each scene, the one for controlling the position of the resistance element for the current intensity during a scene and the other for moving the resistance element to a predetermined position for the next succeeding scene, it being understood that the cam links may be preset in advance of a performance for determining the degree of illumination during any scene.

Adjustment of the cam links is accomplished by rotating the adjusting screw 136 counter-clockwise to move a pedestal 135 and its connected links to a forward position of the cam and clockwise for movement of the pedestal to a rearward position. The position of the cam links is indicated by a pointer 139 which projects exteriorly through radial slots 141 which are calibrated from zero to 100 in an outward direction from the center. The indicator 139 is pivoted at 142 upon the periphery of a stationary grooved disc 143 mounted upon a shaft 144 to be hereinafter described. The pointer is a bell-crank lever and is pivotally connected by means of a slot and pin connection 145 to the pedestal 135. The pointers are retained in their position upon the disc 143 by means of a wire ring 146 which may be inserted in assembled position after the pointers or indicators are assembled upon the disc.

When the pedestal and attached cam links are in their extreme forward position, the pointer registers with the zero legend on the front plate 95 of the drum 39 and when the pedestal and links are in their rearmost position, the pointer registers with the "100" legend on the scale.

As previously explained, a shaft 73 is provided with a cam finger 60 for engaging the adjustable cam 65. In order to reduce friction and facilitate smoothness of operation, the finger 60 is provided with a sheave 147 that engages the rearward edges of the composite cam links and causes the shaft 73 to be moved longitudinally when the follower drum 39 is rotated. The shaft 73, in the present instance, comprises a sleeve which is slidably mounted upon a shaft 148 that is secured to a bracket 149 carried by the drawer frame 82. The sleeve 73 is slidably mounted in the bracket 131, previously referred to and is biased in a forward direction for maintaining the sheave 147 in engagement with the cam links by the spring 74 that is disposed between the end of the sleeve and the bracket 149 and surrounding the shaft 148. The sleeve or shaft 73 is provided with an arm 72 having an enlarged portion 152 provided with a bore 153 for slidably receiving the cam sleeve 69. The portion 152 is provided with a pin 154 that projects into the helical slot 71 in the sleeve 69 and causes rotation of the cam sleeve 69 in a clockwise direction when the shaft 73 is moved forwardly by the spring 74.

From the foregoing, it is apparent that when the follower drum 39 and cam 65 are rotated counter-clockwise, the shaft 73 is caused to move because of the varying cam surface which has been preset to produce predetermined lighting effects. The cam sleeve 69, through its engagement with the inclined cam surface 68 of the cam sleeve 67, imparts rotary movement to the latter and to the shaft 66, which, in turn, causes the movable resistance member 33 to be rotated and thereby vary the resistance of the element 31. The member 33 is so positioned relative to the resistance coil 32 that when the shaft or sleeve 73 is in its extreme forward position, all of the resistance of the element is included in the circuit. At this time, the pointer registers with the legend zero on the radial scale and indicates that there is no illumination of the lamps connected in the circuit to which the resistance element is connected. When the shaft 73 occupies its rearward position, as a result of its engagement with the adjustable cam 65, all of the resistance is cut out of the circuit and the pointer registers with the legend "100" of the radial scale, indicating full illumination. The scale is calibrated to indicate the degree of illumination between no light and full illumination, and the pointer therefore indicates the percentage of illumination.

Referring to Fig. 2, it will be noted that the exposed periphery of the front plate 96 of the driven drum 34 is bevelled and provided with the legends I to X in roman numerals equally spaced 36° apart. Each numeral indicates the position that the driven drum should occupy with respect to the indicating arrow 155 for a corresponding scene. As shown in Fig. 2, the drum 34 is in the position that it should occupy at the beginning of scene I. The indicator 139 registers with zero of the scale of the radial slot 141 that is alined with the arrow 155 and the indicator of the next adjacent radial slot to the right registers with the legend "100". This setting of the indicators through the medium of the adjusting screws 136 indicates that when the drum 34 is rotated 18° in a counter-clockwise direction, the resistance will gradually be entirely cut out during the progress of the scene from the beginning to the end thereof, it being assumed that the drum 34 is rotated at a uniform rate of speed and at a speed that will cause rotation through 18° during the period of the scene.

It will be noted that the indicator of the scene alined with the numeral II on the dial or plate 96, registers with the number 50. This number indicates that the lighting for scene II will be started at 50% illumination. The resistance element 31 is set to cause 50% illumination at the beginning of scene II by a movement of the drum 34 in a counter-clockwise direction through 18°, a movement hereinafter called the "change" movement to distinguish it from the first or "scene" movement of the drum. A "change" movement of the drum through 18° is made between each successive scene and in the present example, this first "change" movement between scene I and scene II causes the resistance element 31 to be moved from no resistance to a position wherein it reduces the illumination to 50%. Therefore, at the beginning of scene II, the illumination of the circuit will be 50%.

The indicator 139 in the radial groove between the legends II and III on the dial registers with the mark indicating 10% on the scale which indicates that during scene II the illumination is to start at 50% and be reduced to 10%. During the following "change" movement, the illumination will be set for scene III and, as indicated, the illumination at the start of scene III is 80% and is cut down to 50% at the end of the scene. It is thus illustrated that any degree of illumination may be attained at the start of the scene and the degree of illumination changed to a predetermined amount as the scene progresses.

The bevelled edge of the plate 95, is provided with the legends "scene" and "change" between any two of the numerals on the dial, thus indicating whether the dial is in a "scene" position or in a "change" position of its operation.

*Dimmer time determining mechanism*

In certain instances it is desirable to change the illumination of a lighting circuit at a predetermined rate and a predetermined degree of change at a predetermined time or period during the scene, for instance, it may be desirable to introduce blue illumination starting at zero illumination at the start of the scene and progress to 50% illumination during the first half of the scene and maintain 50% illumination constant during the third quarter of the scene and to subsequently increase the illumination during the balance of the scene. The means for producing such an effect includes mechanism for arresting movement of the follower drum at a predetermined time and for permitting it to follow the driven drum 34 at a predetermined relative speed after a predetermined movement of the latter drum and thereby actuate the dimmer apparatus as the follower drum moves to its original relative position with respect to the driven drum.

The front plate 96 of the driven drum 34 is provided with two stop members 156 and 157, between which a stop member 158 secured to the follower drum 39 may move through substantially 18°. The follower drum may, therefore, turn with respect to the driven drum through at least 18°. Apparatus for arresting movement of the follower drum as the driven drum progresses and for releasing the follower drum so that it may follow the driven drum at predetermined times, includes the brake or clamp screw 42, Fig. 3, threaded in a bracket 47 secured to the drawer frame 82.

Figure 12:
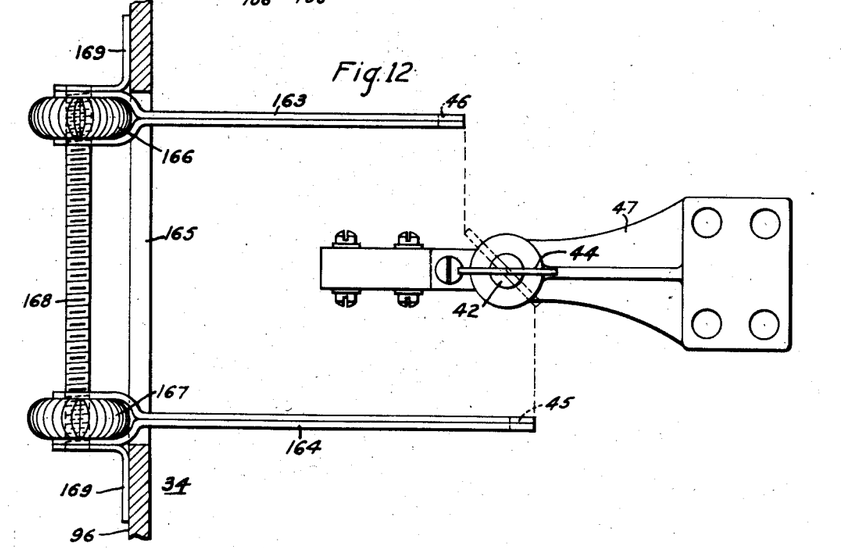
Fig. 12 is a top plan view of "start" and "stop" mechanism employed in apparatus shown in Figs. 2 and 3.

The screw is provided with radial fins 43 and 44 and a "quick" thread. Therefore slight rotation thereof causes the inner end thereof to engage an annular brake band 162 mounted upon the drum 39. The driven drum 34 is provided with a pair of adjustable arms 163 and 164. Figs. 2, 3 and 12, that are bifurcated at their outer ends and which project through slots 165 in the front plate of the driven drum 34. The forked ends of the arms straddle threaded adjusting wheels 166 and 167, respectively, the screws being mounted upon a fixed threaded shaft 168 that is supported in brackets 169 secured to the front plate 96 of the driven drum 34.

The inner ends of the arm 164 and 163 are provided with inwardly extending fingers 45 and 46 that are adapted to engage the fins 44 and 43, respectively, of the brake screw 42 and, as the drum 34 progresses in its counter-clockwise movement, the fingers alternately engage the fins 43 and 44 causing, first, locking engagement of the screw 42 with the brake band 162 on the follower drum 39 which holds the drum stationary and subsequent release of the screw, which action permits the follower drum to follow the driven drum in response to the tension of the spring 97 which yieldingly connects the two drums.

*Apparatus for independent or simultaneous operation of dimmers*

When an operator desires to experiment with the lighting for a given scene, it is desirable that the intensity of the illumination of any circuit may be varied at will and independently of the other circuits. It is also desirable at such times that all of the circuits may be completely energized or deenergized simultaneously. It may under some circumstances be desirable to turn all of the lights of the stage or auditorium on full during an emergency or to turn out all of the lights in the auditorium or stage. These operations were previously referred to and certain parts of the apparatus described.

The shaft 144 is pivoted in the front face 95 of the follower drum 39 and is journalled at its rear end in a bracket 171. The operating handle 79 is secured to the outer end of the operating shaft 144 and is provided with a pointer 172 which registers with a scale 173 that is graduated from zero to 100 to indicate the degree of illumination resulting from a predetermined position of the pointer or operating handle. The pointer 172 is slidably mounted in the handle and may be adjusted with respect thereto by means of adjusting screws 174 to compensate for variations in the resistance elements of the different circuit controlling units.

As previously stated, the operating handle 79 Fig. 3 is connected to the movable rheostat member 66 through the medium of the shaft 144 and a fork member 70 that straddles a pin 175 mounted upon the clutch member 67. In order to actuate the rheostat 31 independently of the mechanism associated with the adjustable cam 65, the semi-circular shaft 76 is rotated through 90°, thus forcing the cam member 67 to its forward position by reason of its engagement with the extension 77 of the cam member 67. Movement of the cam member 67 to the forward position disengages it from the cam face 68 of the sleeve 69 and consequently, the member 67 may be rotated without causing movement of the sleeve 69. Rotation of the member 69 imparts rotary movement to the shaft 66 which, in turn, rotates the shaft 126 of the rheostat through the medium of the bevel gear 127.

From the foregoing, it will be seen that movement of the operating handle 79 causes a corresponding movement of the rheostat shaft 126, thus enabling the operator to manually actuate the rheostat and to secure any desired intensity of illumination independently of the setting for the other circuits.

The shaft 76 is provided with a pair of pins 81 that straddle the extensions 77 of the cam member 67 in such manner that they cause the latter to be turned when the shaft 76 is reciprocated longitudinally. The pins 81 are so disposed on the shaft 76 that they engage it only when the shaft is rotated through 90° in a counter-clockwise direction from the position indicated in Fig. 3 and after the cam member 67 has been moved to its forward position by reason of the rotation of the shaft 76. Since a pair of pins 81 are provided to cooperate with the cam member of each circuit controlling unit, all of the rheostats of the various units will be actuated simultaneously when the rod 76 is reciprocated. By reason of the construction just described, all of the rheostats may be moved to eliminate all resistance in the circuits regardless of their positions at the time the rod is operated.

By reason of the above described apparatus, an operator may preset the lighting effects for ten separate scenes. Any circuit may be energized to any predetermined degree and at predetermined times and for a predetermined duration of time during progress in the scene. The intensity of illumination may be increased or decreased if desired, and to a predetermined extent. The intensity of any illuminating circuit may be varied manually independently of the other circuits.

After the desired illumination for a scene has been determined and the instrumentalities of the switchboard adjusted to produce a predetermined effect during a scene, it is not necessary to alter or change the adjustments to produce the same effect repeatedly. This is of considerable advantage where a performance is frequently repeated, as is done in theaters of the larger cities.

While setting up the switchboard during a rehearsal, it may be desirable to secure the lighting effect of certain individual circuits for non-consecutive scenes, in which event the driven drums should be independently operable in order to register the cam for the desired scene with the rheostat control mechanism. The worm shaft 36 is therefore supported upon a bracket 222 fixed to a rotatable shaft 223 which is operable from the front of the switchboard or from any desired location and movable to the dotted line position shown in Fig. 3 to disengage all of the drums from the worm shaft 36. The drums can then be moved independently.

*Modified form of apparatus*

In Figs. 4 to 8 I have illustrated a modified form of drum control apparatus which comprises a stop plate 181 that is pivotally mounted on the bracket 158 for movement about a pivot shaft 182. The upper end of the stop plate is provided with a shoulder 183 which engages the bracket 158 and limits rotary movement in a clockwise direction, the plate being yieldingly normally retained in the position shown in Figs. 5 and 8.

Figure 5:
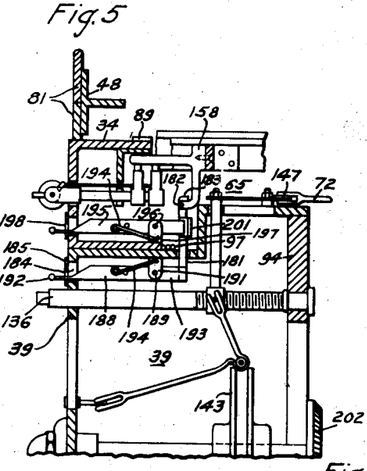
Fig. 5 is a longitudinal section through the apparatus shown in Fig. 4, taken on the line V—V thereof.
Figure 8:
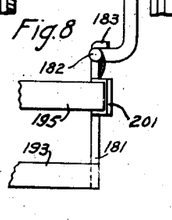
Figure 9:
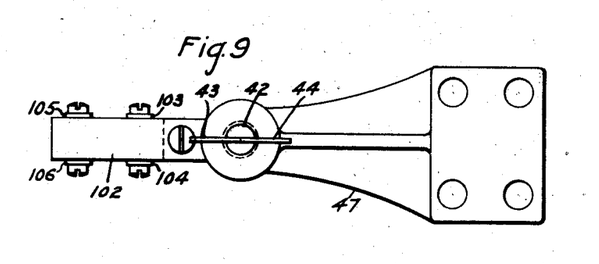
Figs. 9 and 10 are top plan and side elevational views of switch mechanism employed in the apparatus shown in Figs. 2, 3 and 4.
Figure 10:
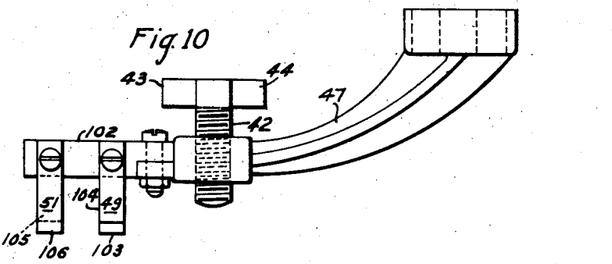

The follower drum 39 is provided with a plurality of slots 184, one for each scene, the slots being covered by a slotted indicator plate 185 serrated at 186 and having a graduated scale 187. An adjustable stop arm 188 is pivotally and slidably mounted upon a shaft 189 carried by a bracket 191 secured to the follower drum 39. The outer end of the stop arm 188 projects through the slot 184 in the slotted indicator plate 185 and terminates in an operating handle 192. The inner end of the stop arm 188 is provided with an extension 193 that extends across the plane of the stop plate 181, as indicated in Figs. 5 and 8, and serves to arrest movement of the follower drum with respect to the driven drum 34, when the extension engages the lower end of the plate 181.

The stop arm 188 may be adjusted to different positions in the slot 184 and is yieldingly retained in adjusted position by means of a leaf-spring 194 which tends to place the outer end of the stop arm into the ridges between the teeth of the serrated plate 185.

The driven drum 34 is provided with a starting arm 195, similar to the stop arm 188, which is pivotally and slidably mounted upon a shaft 196, carried by a bracket 197, secured to the driven drum 34. The outer end of the starting arm 195 projects through a slot 198, in the driven drum 34, and a slotted or serrated indicator plate 199, similar to the plate 185, is disposed adjacent the slot 198. As indicated in Figs. 5 and 8, the stop plate 181 is provided with an angularly disposed cam wing 201, that is adapted to be engaged by the inner end of the stop arm 195. The latter is moved with the driven drum toward the said stop plate. Since the cam wing is inclined with respect to the face of the plate 181, movement of the arm 195 causes the stop plate 181 to be rotated in a counter-clockwise direction, causing it to be moved out of engagement with the stop arm extension 193, thereby causing the release of the follower drum and subsequent following movement with respect to the driven drum.

It will be seen from the foregoing that the position of the stop arm 188 and the starting arm 195 determines the time at which movement of the follower arm is arrested, and the time at which it is released. The indicating scales 187 of the plates 185 and 199 are graduated from zero to 100 and indicate the time during the scene at which the follower drum remains stationary or is moved.

In order to regulate the speed at which the spring 97 moves the follower drum with respect to the driven drum after it is released, a speed regulating device is provided which comprises a bevel gear 202 mounted on the driven drum 34 and it meshes with a pinion 203 mounted on a shaft 204, supported from a stationary bracket 205 attached to the drawer frame. The upper end of the shaft 204 is provided with a bevel gear 206 that meshes with a pinion 207, secured to the end of a hollow shaft 208. The shaft 208 is journalled in the bracket 209 and in the front panel plate 81 which is provided with an indicating dial 211 that turns with the hollow shaft 208.

Figure 6:
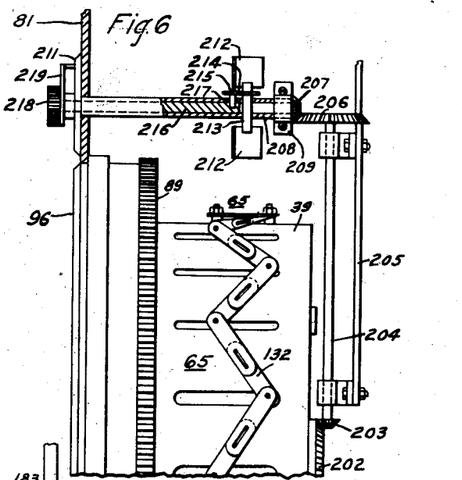
Fig. 6 is a longitudinal section of a fragment of the apparatus shown in Fig. 4, taken on the line VI—VI thereof and showing portions of the apparatus in side elevation.
Figure 7:
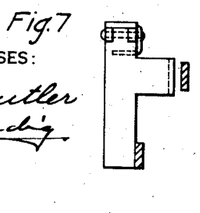
Figs. 7 and 8 are front and side elevations of details of "start" and "stop" mechanism employed in the apparatus shown in Fig. 4.

A pair of blades 212 are mounted upon the shaft 213 that is journalled in the hollow shaft 208 as indicated in Fig. 6, the shaft being provided with a fork member 214 that straddles a pin 215 projecting from an internal shaft 216 through a slot 217 in the hollow shaft 208. The internal shaft 216 is provided at its outer end with an operating member 218, provided with a pointer 219 which registers with a scale 221, mounted upon the indicator dial 211.

The purpose of the blade members 212 is to impede the rotation of the follower drum 39 and the bevelled gear 202, the degree of impedance being determined by the angle of the blades 212 with respect to the plane of revolution thereof. When the blades are in a plane parallel to the plane of revolution, they offer the least impedance to the rotation thereof and when they are disposed at right angles to the plane of rotation, offer the greatest impedance.

The angle at which the blades are disposed is determined by the position of the pin 215 with respect to the hollow shaft 208, it being understood that the pin engages the member 214 and turns the blade members 212. The scale on the indicator dial 211 is graduated from zero to 100 for indicating the position occupied by the blade members with respect to the plane of revolution thereof.

By reason of the apparatus just described, the relative speed of the follower drum and driven drum is so regulated that a predetermined time interval lapses between the time the follower drum is released and the time it assumes its normal position with respect to the driven drum.

*Operation of modified form of apparatus*

Figure 4:
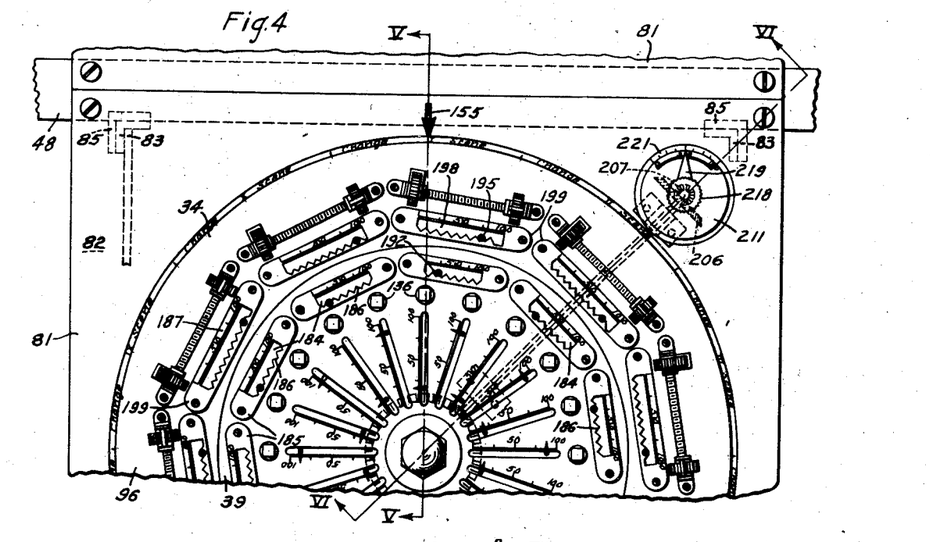
Fig. 4 is a front elevational view of a fragment illustrating a modified form of control unit.

Assuming that it is desired to arrest movement of the driven drum 39 at the beginning of the second quarter of scene one in order to prevent further change of the light intensity during the second and third quarter of the scene, the stop arm 188 is positioned in the slot 184 opposite the graduation indicating 25%, as indicated in Fig. 4, the position of the arm being indicated by the black circle, and assuming that it is desired that the current intensity be increased during the remaining 25% of the scene, the starting arm 195 is disposed in the slot 198 as indicated by the black circle opposite the point on the scale indicating 75%.

At the commencement of the scene, the driven drum 34 is started to rotate at a predetermined speed, the speed being so regulated that the driven drum will be caused to travel through 18 degrees during the scene. When the driven drum has travelled 25% of its limit of travel during the scene, the stop arm 188 engages the stop plate 181 and arrests movement of the follower drum. No change of illumination will occur until the driven drum has been moved through 75% of its travel or until it has been released by the starting arm 195, engaging the cam wing 201 of the stop plate 181. The instant the follower drum is released, the current intensity will be caused to vary in accordance with the setting of the cam 65 thereon, and the light intensity will continue to vary until the time of the scene or until the follower drum has assumed its original position with respect to the driven drum. The rate of change of illumination of the circuit is controlled by the angle of the wing members 212, previously referred to, which determines the speed of rotation of the follower drum.

It will be seen from the foregoing description of the control apparatus for each circuit that any desired degree of energization of the circuit can be accomplished at predetermined times and the rate of change can be predetermined.

Because of the flexibility of the control apparatus, it is possible to produce lighting effects that have not heretofore been possible. Colors may be blended to produce harmonious shades by combining various colors at different intensities, and harmonious color combinations can be produced at predetermined times during the period of the scene. In addition, the switchboard can be preset to repeat the color combination selected without necessitating changes in adjustment.

While I have illustrated but two embodiments of my invention, it will be apparent to those skilled in the art that various changes, modifications, substitutions, additions and omissions may be made in the apparatus illustrated without departing from the spirit and scope of my invention, as set forth in the appended claims.

I claim as my invention:

1. The combination with a current controlling means movable for varying the intensity of the current supplied to an electric circuit, of a plurality of individually adjustable means for actuating the current controlling means for independently effecting the current controlling means a predetermined degree and means for progressively bringing the moving means into cooperative relation with the said controlling means.

2. The combination with a current controlling means for varying the intensity of the current supplied to an electric circuit, of a selector means movable to different operative positions and provided with a plurality of means adapted to be individually preset for selectively actuating the controlling means, at predetermined times during a predetermined movement of the selector means.

3. The combination with a current controlling means for varying the intensity of the current supplied to an electric circuit, of a selector means movable to different operative positions and provided with a plurality of means adapted to be individually preset for selectively actuating the controlling means predetermined degrees during a predetermined movement of the selector means.

4. The combination with a current controlling means for varying the intensity of the current supplied to an electric circuit, of a selector means movable to different operative positions and provided with a plurality of means adapted to be individually preset for selectively actuating the controlling means, to effect either an increase or decrease in current intensity in the said circuit during movement of the selector means.

5. The combination with a current controlling means for varying the intensity of the current supplied to an electric circuit, of a selector means movable to different operative positions and provided with a plurality of means adapted to be individually preset for selectively actuating the controlling means, to effect either an increase or decrease in current intensity in the said circuit during movement of the selector means, and means for controlling the rate of increase or decrease of the current intensity.

6. The combination with a current controlling means for varying the intensity of the current supplied to an electric circuit, of a selector means movable to different operative positions and provided with a plurality of means adapted to be individually preset for selectively actuating the controlling means, to effect either an increase or decrease in current intensity in the said circuit during movement of the selector means, and means independent of the movement of the selector means for controlling the rate of increase or decrease of the current intensity.

7. Theater lighting control mechanism comprising a current controlling means movable for varying the intensity of the current supplied to an electric circuit, and a plurality of alterable means each for separately moving the controlling means different predetermined degrees upon movement thereof equal distances.

8. Theater lighting control mechanism comprising a plurality of current controlling rheostat for varying the intensity of current supplied to a plurality of electrical circuits, a plurality of movable members each having a plurality of individually alterable means for separately actuating the respective controlling rheostat of each circuit, and means for simultaneously actuating the movable members to bring the alterable means into cooperative relation with the current controlling means.

9. Theater lighting control mechanism comprising a current controlling means for varying the intensity of the current supplied to a circuit, a movable member and a series of adjustable means thereon for successively actuating the controlling means and for effecting the latter to a predetermined degree.

10. Current controlling mechanism comprising a current controlling means for varying the intensity of the current supplied to the circuit, and an adjustable cam for actuating the controlling means varying degrees.

11. Current controlling mechanism comprising a current controlling means for varying the intensity of the current supplied to the circuit, an adjustable cam for actuating the controlling means varying degrees, and means for actuating the controlling means independently of the cam.

12. Current controlling mechanism comprising a plurality of current controlling means for varying the intensity of the current supplied to a plurality of circuits, adjustable cam members for each controlling means for actuating the controlling means varying degrees and means for simultaneously actuating the said cam members.

13. Current controlling mechanism comprising a current controlling means for varying the intensity of the current supplied to the circuit, an adjustable cam for actuating the controlling means varying degrees and means for indicating the degree of movement of the controlling means.

14. Current controlling mechanism comprising a current controlling means for varying the intensity of the current supplied to the circuit, an adjustable cam for actuating the controlling means varying degrees and means for indicating the range of movement of the controlling means.

15. Current controlling mechanism comprising a current controlling means for varying the intensity of the current supplied to the circuit, an adjustable articulated cam member for actuating the controlling means and having a plurality of cam sections, and means for adjusting the relative positions of the joints of the cams for varying the contour of the cam.

16. Current controlling mechanism comprising a current controlling means for varying the intensity of the current supplied to the circuit, a cam member for actuating the controlling means and means for altering the contour of the cam to effect the controlling means predetermined degrees.

17. Current controlling mechanism comprising a current controlling means for varying the intensity of the current supplied to the circuit, a rotatable drum and an adjustable cam member for actuating the controlling means varying degrees mounted upon the drum, and means for rotating the said drum.

18. Current controlling mechanism comprising a current controlling means movable for varying the intensity of the current supplied to the circuit, a member movable a predetermined distance during a unit of time and a plurality of individually adjustable means actuated thereby for separately moving the controlling means during a predetermined period of said time unit and for varying the current intensity a predetermined degree during the said period.

19. Current controlling mechanism comprising a current controlling means movable for varying the intensity of the current supplied to the circuit, a member movable a predetermined distance during a unit of time and a plurality of means movable thereby for actuating the said controlling means during a predetermined interval of said period.

20. Current controlling mechanism comprising a current controlling means movable for varying the intensity of the current supplied to the circuit, a member movable a predetermined distance during a unit of time and a pluarlity of presettable units actuated thereby for moving the said controlling means during predetermined interval of the said period, and for varying the current intensity a predetermined degree during the said period.

21. Current controlling mechanism comprising a current controlling means movable for varying the intensity of the current supplied to the circuit, a cam member for moving the controlling means, a member for actuating the cam member movable a predetermined distance during a unit of time, and means for causing movement of the cam member at predetermined periods during the said time unit.

22. Current controlling mechanism comprising a current controlling means for varying the intensity of the current supplied to the circuit, a cam member for actuating the controlling means, a member for actuating the cam member movable a predetermined distance during a unit of time and yieldingly connected in driving relation to the cam member, and means for arresting movement of the cam member and for releasing the cam member at predetermined intervals of the said time unit.

23. Current controlling mechanism comprising a current controlling means for varying the intensity of the current supplied to the circuit, and a cam member for actuating the control means yieldingly connected in driving relation to the cam member and adjustable means for arresting movement of the cam member and for releasing the cam member at predetermined intervals of the said time unit.

24. Current controlling mechanism comprising a current controlling means for varying the intensity of the current supplied to the circuit, a cam member for actuating the controlling means, a member for actuating the cam member movable a predetermined distance during a unit of time, and yieldingly connected in driving relation to the cam member, means for arresting movement of the cam member and for releasing the cam member at predetermined intervals of the said time unit and means for controlling the speed of relative movement of the cam member and the actuating member.

25. Current controlling mechanism comprising a single current controlling means movable for varying the intensity of the current supplied to a circuit, a movable member and a plurality of actuating members for the current controlling means carried by the movable member and adapted to successively move the current controlling means.

26. Current controlling mechanism comprising a single current controlling means movable for varying the intensity of the current supplied to a circuit, a movable member and a plurality of members carried by the movable member for successively causing movement of the current controlling means.

27. Current controlling mechanism comprising a single current controlling means for varying the intensity of the current supplied to a circuit, a movable member, and a plurality of individually adjustable actuating members for the current controlling means carried by the movable member and adapted to successively actuate the current controlling means.

28. Current controlling mechanism comprising a single current controlling means for varying the intensity of the current supplied to a circuit, a movable member, and a plurality of individually adjustable members carried by the movable member for successively causing operation of the current controlling means.

29. Current controlling mechanism comprising a current controlling means having "on" and "off" operating members, a movable member and a plurality of pairs of actuating members for the operating members adjustable with respect to the movable member, for successively operating their respective "off" and "on" members at predetermined intervals in response to movement of the movable member.

30. Current controlling mechanism for a circuit comprising a current controlling member, a movable member, and a plurality of pairs of relatively adjustable members mounted on the movable member for causing the controlling member to be actuated to open and close the circuit by each pair of members as they are successively brought into operative relation to the current controlling member.

31. Current controlling mechanism comprising relatively movable supporting and current controlling members, a plurality of pairs of members carried by the supporting member for initiating opening and closing operation of the current controlling member as each pair is brought into operative relation to the controlling member upon relative movement of the first said members.

32. Current controlling mechanism comprising relatively movable supporting and current controlling members, a plurality of pairs of adjustable members carried by the supporting member for initiating opening and closing operation of the current controlling member as each pair is brought into operative relation to the controlling member upon relative movement of the first said members.

33. The combination with a current controlling means movable for varying the intensity of the current supplied to an electric circuit, of a plurality of individually pre-settable means for moving the current controlling means predetermined different degrees upon a movement of the presettable means equal distances, and means for selectively bringing the pre-settable means into operative relation with the said controlling means.

34. The combination with a plurality of separate controlling means for varying the intensity of the current supplied to a plurality of electric circuits, of a plurality of alterable individually pre-settable means for each controlling means for effecting the controlling means to produce different current intensities in response to uniform operative alteration of the state of each pre-settable means, and means for simultaneously and uniformly altering the state of the pre-settable means associated with the several controlling means.

35. The combination with a plurality of separate controlling means for varying the intensity of the current supplied to a plurality of electric circuits, of a plurality of alterable individually pre-settable means for each controlling means for effecting the controlling means to produce different current intensities in ascending or descending values in response to uniform operative alteration of the state of each pre-settable means, and means for simultaneously and uniformly altering the state of the pre-settable means associated with the several controlling means.

In testimony whereof I have hereunto subscribed my name this nineteenth day of August, 1926.

JAMES C. MASEK.